United States Patent [19]
Nishiyama et al.

[11] Patent Number: 5,721,942
[45] Date of Patent: Feb. 24, 1998

[54] PERSONAL INFORMATION DISPLAY SYSTEM FOR SERVING LARGE CAPACITIES OF GENERAL INFORMATION TO USER-DESIGNATED STATIONS AT USER-DESIGNATED TIMES

[75] Inventors: Nobumasa Nishiyama, Hachioji; Hiroaki Koyanagi, Hiratsuka; Kouichi Hoashi, Hadano; Sayaka Shinomoto, Kyoto; Ryuichiroh Tamochi, Ibaraki-ken; Kouji Takai, Odawara, all of Japan

[73] Assignees: Hitachi Maxell, Ltd., Ibaraki; Hitachi, Ltd., Tokyo; Hitachi Computer Peripherals Co., Ltd., Ibaraki; Hitachi Instrument Engineering Co., Ltd., Katsuta, all of Japan

[21] Appl. No.: 791,140

[22] Filed: Nov. 13, 1991

[30] Foreign Application Priority Data

Nov. 14, 1990 [JP] Japan .................................. 2-306264

[51] Int. Cl.⁶ .................................................. G06F 15/74
[52] U.S. Cl. .................. 395/800; 395/444; 360/113; 364/242.94; 364/243; 364/DIG. 1
[58] Field of Search ......................... 395/800, 650, 395/200, 600, 200.01, 444, 611; 235/488; 361/680; 360/113; 364/242.94, 243, DIG. 1

[56] References Cited

U.S. PATENT DOCUMENTS

| | | | |
|---|---|---|---|
| 4,012,781 | 3/1977 | Lin | 360/113 |
| 4,591,974 | 5/1986 | Dornbush et al. | 395/100 |
| 4,636,947 | 1/1987 | Ward | 395/650 |
| 4,903,222 | 2/1990 | Carter et al. | 361/680 |
| 5,008,661 | 4/1991 | Raj | 340/825.54 |
| 5,039,928 | 8/1991 | Nishi et al. | 320/2 |
| 5,109,439 | 4/1992 | Froessl | 382/61 |
| 5,165,018 | 11/1992 | Simor | 395/200 |
| 5,241,165 | 8/1993 | Drexler | 235/488 |
| 5,295,222 | 3/1994 | Wadhna et al. | 395/1 |

*Primary Examiner*—John E. Harrity
*Attorney, Agent, or Firm*—Antonelli, Terry, Stout, & Kraus, LLP

[57] ABSTRACT

A personal information display system is provided with a portable information display device for reading information to be used from a storage medium, a communication network for transmission of information, input/output apparatus for input/output of information, an input/output control apparatus connected between the communication network and the input/output apparatus, an information control apparatus having a hierarchical memory connected to the communication network, and an information output apparatus connected to the information control apparatus to transfer information to the storage medium of the portable information display device.

15 Claims, 7 Drawing Sheets

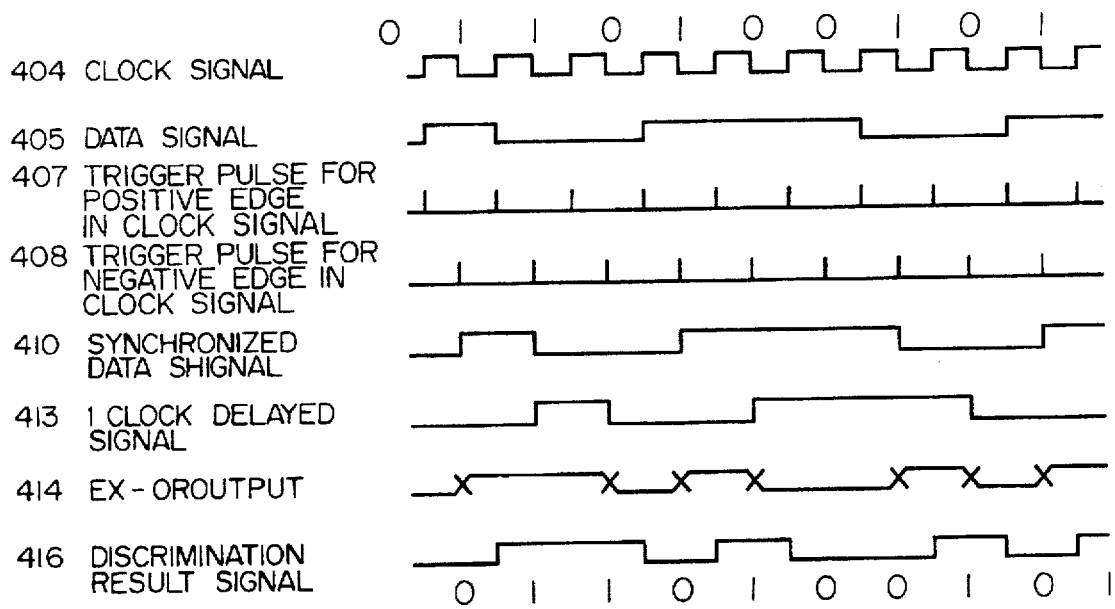
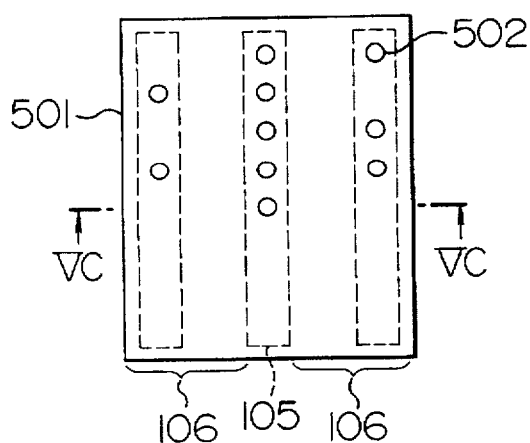
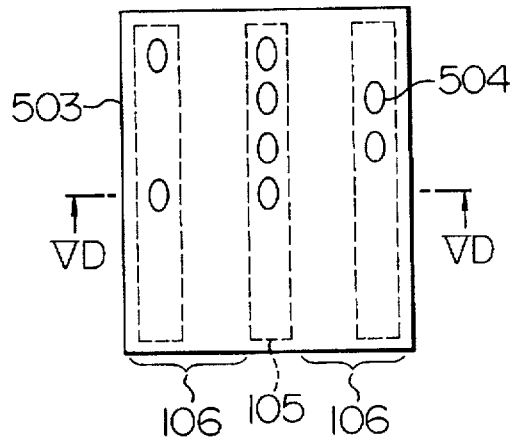
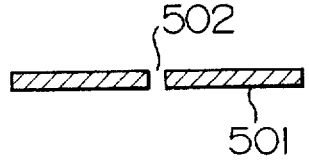
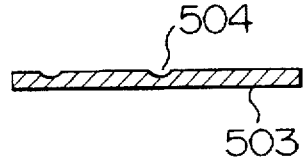

PERSONAL INFORMATION DISPLAY SYSTEM FOR SERVING LARGE CAPACITIES OF GENERAL INFORMATION TO USER-DESIGNATED STATIONS AT USER-DESIGNATED TIMES

BACKGROUND OF THE INVENTION

The present invention relates to a compact portable information display device which handles mass transmission of information serving unspecified persons as well as personal information to thereby display letters and graphical information, and a personal information display system handling the information.

Conventionally, used as a system for transmitting information to unspecified persons was a compact image receiving system which receives an electrical signal transmitted in the form of an electric wave or through wire broadcasting from a broadcasting station and displays image information, a communication system which takes out information by using a minicomputer when a receiving party is ready to receive, a system in which general information optically recorded on a recording medium is served and the information is taken out by reproducing it by means of a compact reproducer, or an information transmission system which uses printed matter. On the other hand, input/output of personal information was effected using a minicomputer. Also available was a portable memory/display system filling the role of a notebook which is incorporated with a semiconductor memory and capable of effecting input/output of personal information ("New aspects of LAN": Nikkei Electronics, 119–146 pp, No. 447, May 16, 1988).

In the case of reception of electric waves, however, information cannot necessarily be obtained specifically at the time that the user asks for the information at a desired place. Further, the user cannot store the information and display it as necessary. Even with the minicomputer, information input means is so limited that information cannot necessarily be obtained specifically at the time that the user asks for the information at a desired place. The recording medium optically recorded with information is not rewritable, and therefore it is discarded after use; and besides, it does not handle personal information and therefore thus it is a mere change of information transmission system. With printed matter, the speed of transmission of information is low. Furthermore, a communication network with personal computers that handles a large amount of information pieces as provided by newspaper, books and magazines and serving unspecified persons.

SUMMARY OF THE INVENTION

An object of the present invention is to provide a personal information display system in which general information of large capacity serving unspecified persons as well as personal information can be obtained anytime and anywhere.

The above object can be accomplished by providing a memory apparatus and information output apparatuses which are connected by a communication network using a plurality of computers and by taking out information from the information output apparatus by means of a portable information display device.

Structurally, data of such originators of large-capacity information serving unspecified persons or destinations such as publishers, newspaper offices and libraries and data of private originators handling personal information are connected to and stored in a communication network, and an input/output terminal apparatus or an information output apparatus installed, for example, on the street or at a site where many persons gather is used to gather necessary information. In using the terminal apparatus installed, for example, on the street, the user personally records a mass transmission of information serving unspecified persons and personal information on an large-capacity magnetic recording medium capable of recording, reproducing and erasing. Then, the recording medium is inserted in an information display device possessed by the individual to display the information recorded on the recording medium.

With the above construction, among pieces of information serving unspecified persons, only necessary information can be recorded on the recording medium anytime and anywhere. Since personal information can also be recorded on the same recording medium, the personal information can be displayed on the display device at the same site. The recording medium is rewritable for the erasure of unnecessary information and can therefore be reused to record new information, thus contributing to effective use of resources. Further, the information serving unspecified persons, which is conventionally printed on paper and thus issued, can be issued by being stored in the large-capacity recording medium. As volume density of information is increased, users have no need to carry a number of transmission and receiving media. Further, the device promotes the conservation of natural resources such as makes the effect that consumption of wood which is used for the production of paper. Furthermore, with the present-day over-abundance of information, necessary information can be taken out selectively, resulting in efficient utilization of time.

To describe the manner of circulation of information, such information serving unspecified persons as in weekly magazines is recorded by an originator in an information memory of a personal information display system. A reader selects one or a plurality of pieces of necessary information alone by means of an information output apparatus connected to the communication network in the system, so that the selected information is recorded on a recording medium of the portable information display device. The recording medium is then extracted from the information output apparatus and connected to the portable information display device to display the information on the display screen. When a different information piece is needed, the needed information is recorded on the same recording medium or on a different recording medium so as to be provided as new information.

As described above, in the personal information display system according to the invention, the memory and the information output apparatus are provided which are connected to the communication network using a plurality of computers and information is taken out of the information output apparatus by means of the portable information display device, whereby among pieces of information serving unspecified persons, only necessary information pieces can be recorded anytime and anywhere. Further, personal information can also be recorded on the same recording medium, thus eliminating the need to carry a number of display devices. When the recorded information becomes unnecessary, the recording medium can be so reused as to be recorded with new information. Information serving unspecified persons, conventionally recorded on paper and issued, can be stored on a recording medium and then be issued. The volume density of information can be increased with the recording medium, with the result that the recording medium can be compact enough to be received in a pocket. In addition, the display system contributes to the conservation of natural resources such as wood which is used to manufacture paper.

BRIEF DESCRIPTION OF THE DRAWINGS

FIG. 4 is a diagram showing signals appearing at various points in the information reproduction signal circuit.

FIG. 5A is a diagram showing a perforation type recording medium used in a second embodiment of the invention.

FIG. 5B is a diagram showing a pit type recording medium used in the second embodiment of the invention.

FIG. 5C is a sectional view of the FIG. 5A perforation type recording medium.

FIG. 5D is a sectional view of the FIG. 5B pit type recording medium.

DESCRIPTION OF THE PREFERRED EMBODIMENTS

Figure 1:
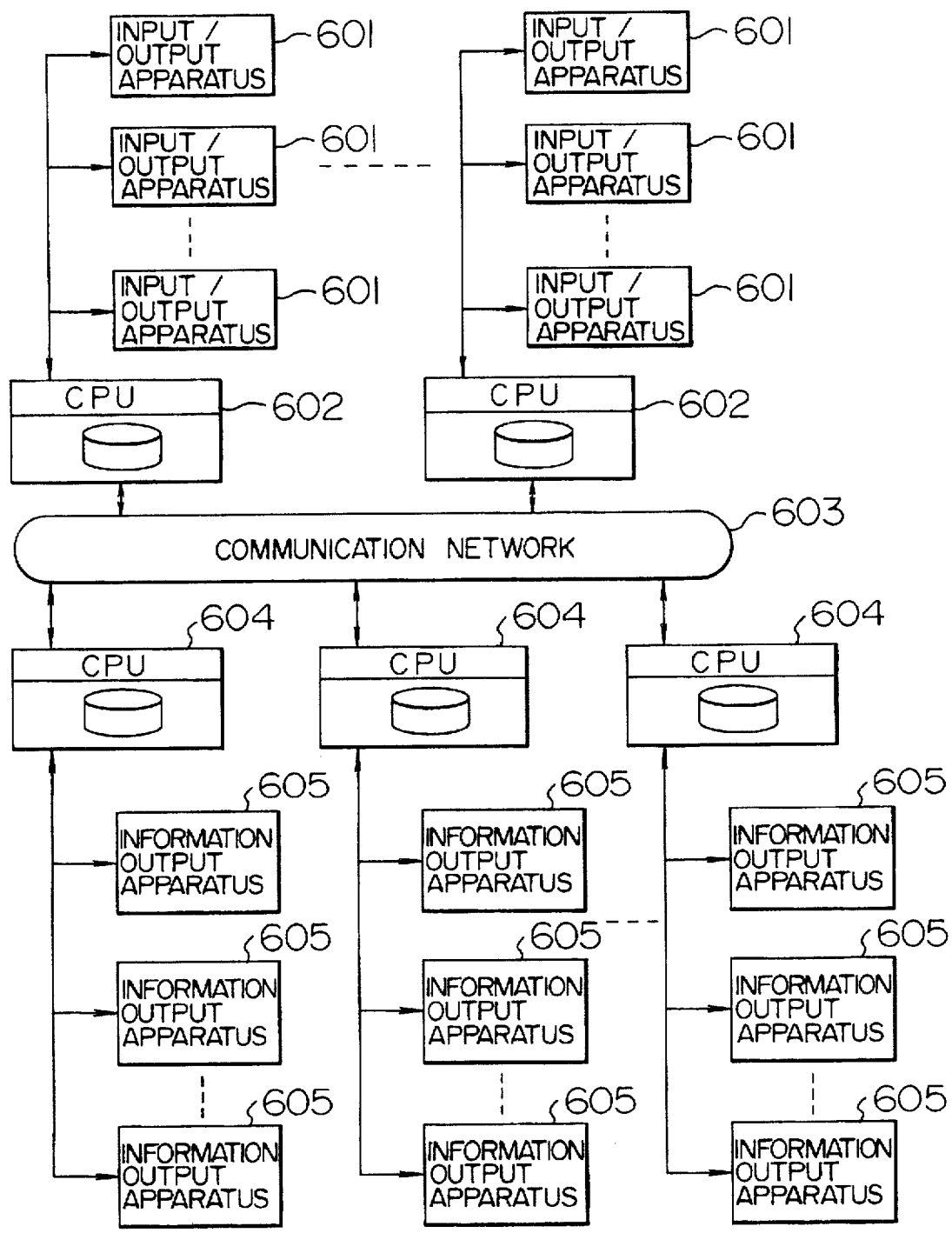
FIG. 1 is a block diagram schematically showing a construction of a personal information display system according to the present invention.

Referring to FIG. 1, a plurality of apparatuses 601 for the input/output of information are each comprised of a minicomputer and they are respectively installed in such originators of mass transmission, large-capacity information serving unspecified persons such as, for example, publishers, newspaper offices and libraries and private homes. Some of the input/output apparatuses 601 are collectively controlled by a host computer and input/output control computers 602. The plurality of input/output control computers 602 are connected in parallel to permit information transmission between terminals. The above construction belongs to a conventional communication system using minicomputers. In accordance with the present invention, a plurality of apparatuses 604 are additionally provided, each of which controls a plurality of information output apparatuses 605 installed, for example, on the street or at sites where many persons gather and includes a memory for storing information present within a communication network 603. The apparatuses 604 are connected in parallel with the input/output control computers 602 to permit delivery of information to the information output apparatuses 605.

Figure 6:
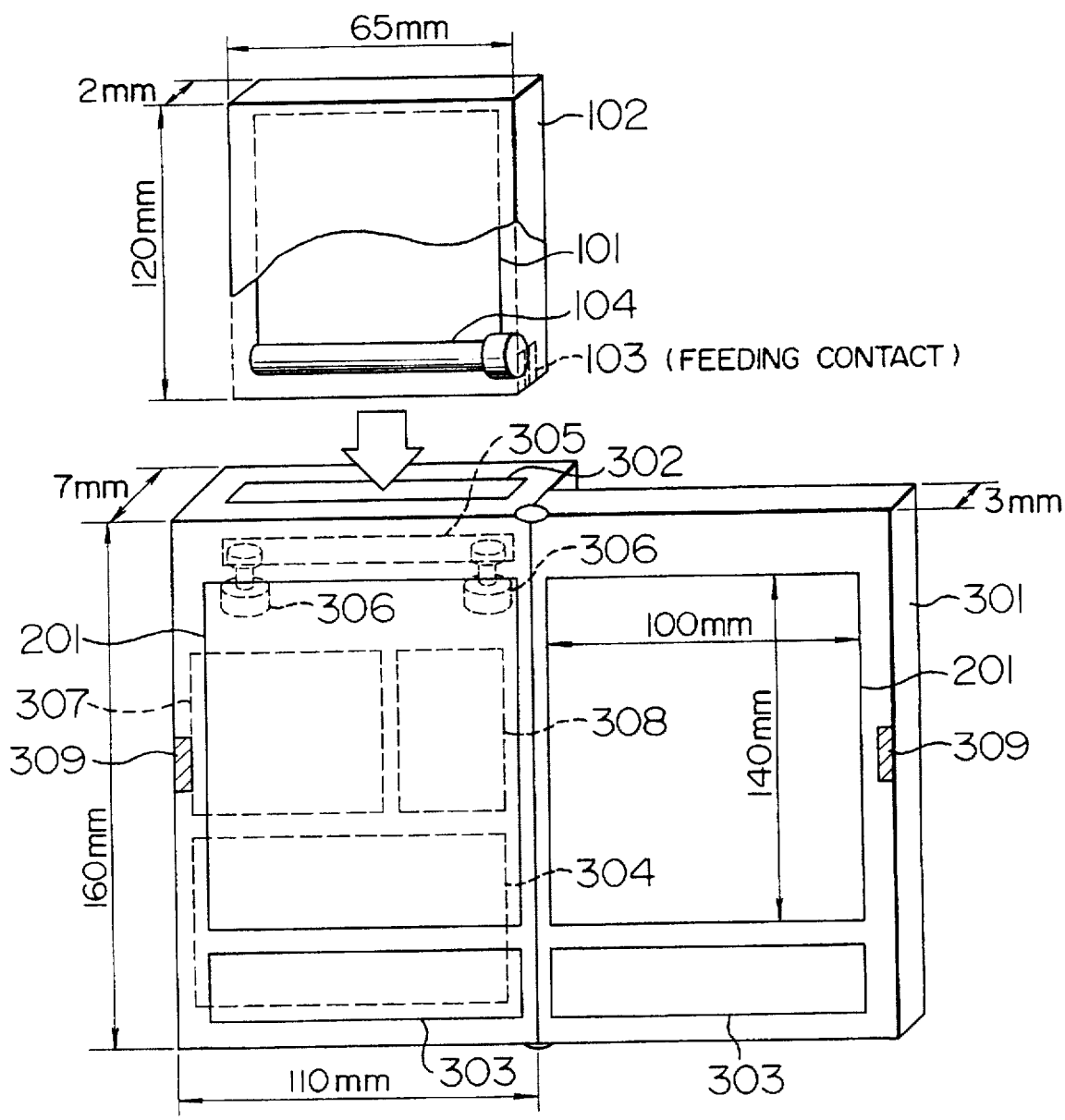
FIG. 6 is a diagram showing a construction of an example of an information display device according to the invention.

With the above construction, information flows in a system as described below. Pieces of information are input from the input/output apparatus 601 installed in publishers, newspaper offices and private homes and the input information pieces are stored in a memory apparatus 602 connected to the communication network 603. In order to fetch necessary stored information pieces, the input/output apparatus 601 or the information output apparatus 605 issues an instruction purporting that the necessary information is to be fetched. Then, the information fetched by the input/output apparatus 601 is delivered to a display screen or an output device; and the information fetched by the information output apparatus 605 is recorded on a recording medium 101 (FIG. 2) inserted therein. The recording medium 101 thus recorded with the information is taken out and inserted in a portable information display device 301 (FIG. 6) possessed by individual persons so as to be reproduced and displayed by means of the information display device 301.

Figure 7:
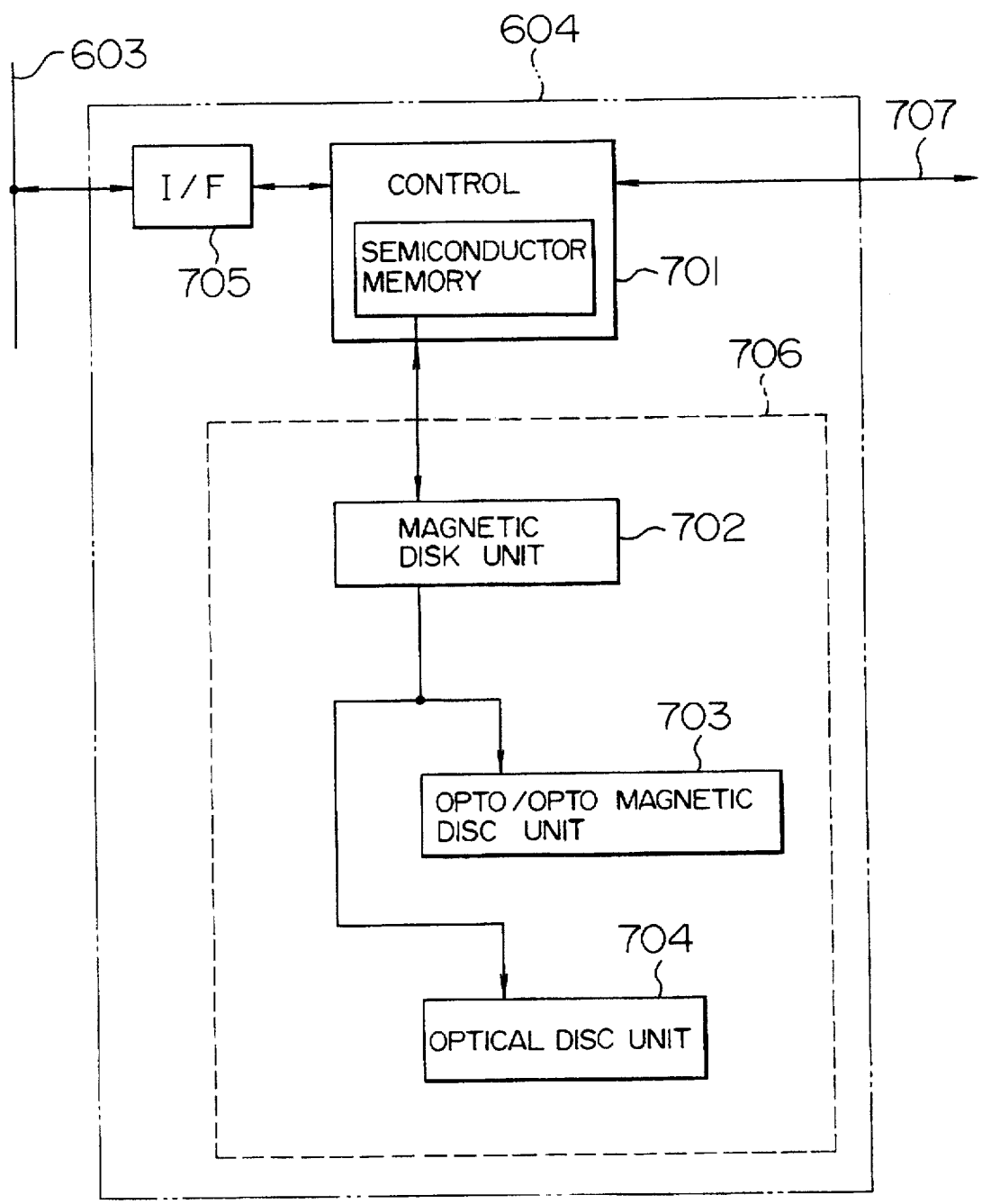
FIG. 7 is a block diagram showing an internal construction of an apparatus provided with a memory to control information output apparatus.

The internal construction of the information apparatus 604, which is operable to control a plurality of information output apparatus 605 and has the memory for recording information present within the communication network 603, will now be described with reference to FIG. 7. The information apparatus 604 includes an interface unit 705 of a computer associated with the communication network 603, a computer unit 701 which manages information used for storing information input from the interface unit 705 in the memory and delivers the information to the individual information output apparatus 605, and a set 706 of external memories. In the computer unit 701, of the information input from the interface unit 705 associated with the communication network 603, only data which can be retrieved at a high speed, that is, classification codes and retrieval key words when taking books for instance, are picked up and stored in a semiconductor memory included in the computer unit 701. At that time, data as to which one of the external memories 706 the information in question is stored in is stored concurrently.

Subsequently, of the information in question, data which can be retrieved in greater detail, that is, the title when taking books for instance, is stored in magnetic disk unit 702 which is of relatively high throughput. The remaining data of the information is stored in an opto or optical magnetic disc unit 703, which is of relatively low throughput but has a large storage capacity, or in an optical disc unit 704. In particular, of the remaining data, data which may be erased in the future, for example, the contents of magazines, is stored in the rewritable opto or optical magnetic disc 703, and data which is preserved for the future is stored in the optical disc 704 of write-once type.

When receiving a request for output from any information output apparatus 605, the information apparatus 604 having data stored in the manner described above retrieves data through high-speed retrieval and transfers retrieved data to the information output apparatus 605. On the other hand, when the data retrieval provides no data, indicating that the requested data is stored in external memories of a different information apparatus 604, the apparatus 604 in question asks the different information apparatus 604 for data retrieval through the communication network 603.

Figure 8:
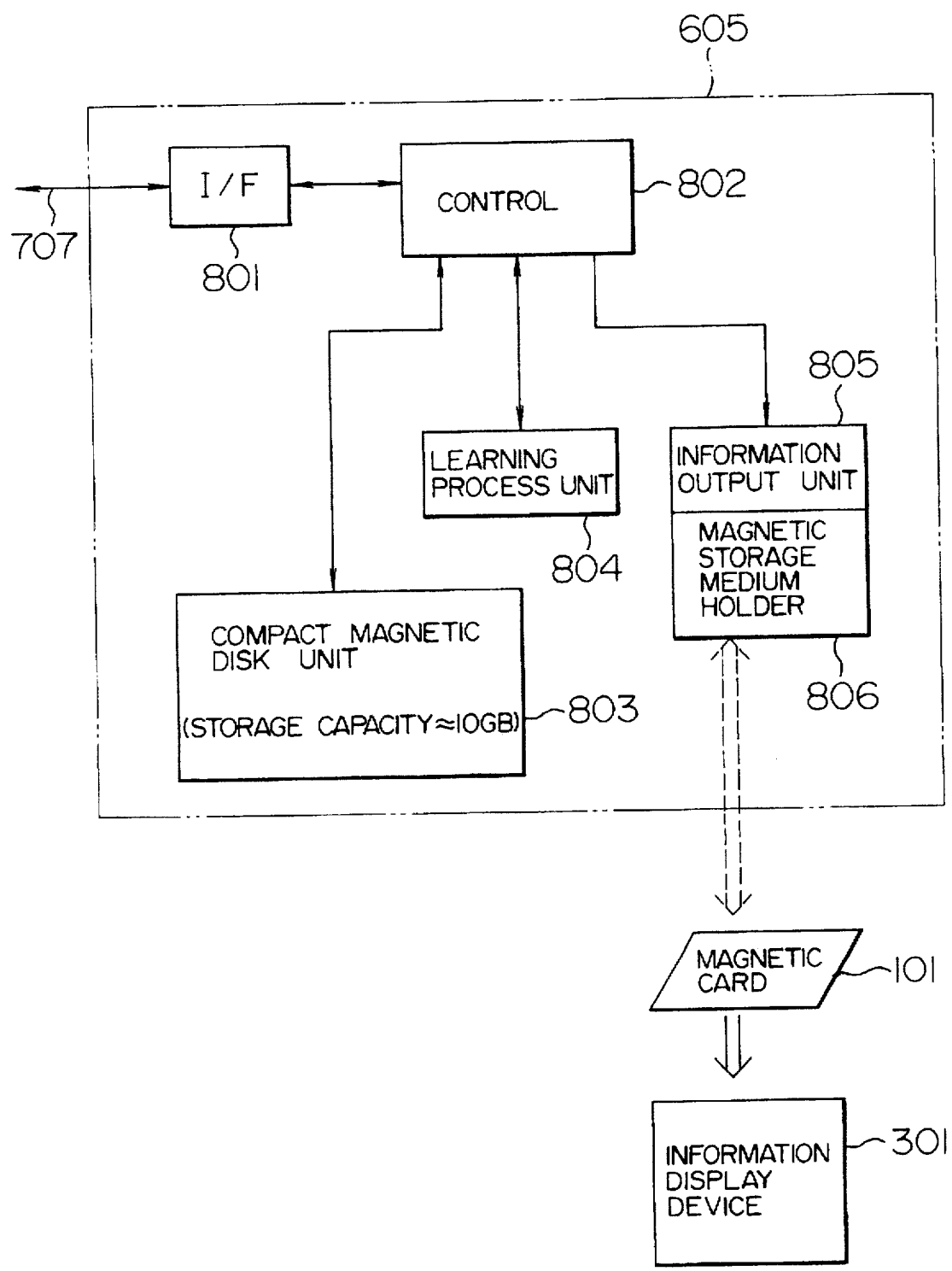
FIG. 8 is a block diagram showing an internal construction of the information output apparatus.

The internal construction of the information output apparatus 605 will now be described with reference to FIG. 8. The information transferred from the computer unit 701 is received by an interface unit 801 and stored in a memory 803 (in this embodiment, a compact magnetic disk unit) through a control unit 802 included in the information output apparatus 605. Data to be stored in this memory includes only the contents which are frequently taken out to serve many and unidentified persons. The contents are checked for their frequency of reference by means of a learning process unit 804. In this process, data as to which category the taken-out information belongs to or data as to what kind of information the taken-out information is recorded each time that the information is recorded, and information liable to be taken out frequently is controlled so as to be resident in the memory 803 included in the information output apparatus. Each time that parent information is updated, associated resident information is also updated. This learning process attains the following advantages: (1) If information liable to be taken out frequently is stored in the large-capacity memory 602, high-speed retrieval cannot be completed without consuming much time. In contrast, when only a relatively small amount of information liable to be taken out frequently is made resident therein, retrieval from the relatively small amount of information is allowed, thereby taking advantage of the high-speed retrieval, and (2) if the individual information output apparatus are ruled so as to directly access the memory apparatus 602, data communication capacity of the communication network is exceeded and communication lines are unduly congested. The communication capacity cannot be increased without considerable expenditure. In contrast therewith, the learning process can limit the communication to a necessary minimum to reduce the communication capacity and the cost of facilities.

On the other hand, when the user inserts a recording medium to be described later to an information output unit 805 and actuates an operation button, information, if present in the memory 803, is transferred from the memory 803 and recorded on a recording medium which is exchangeably held by a recording medium holder 806. In the absence of information in the memory 803, information is retrieved from an associated host apparatus and then transferred and recorded. The storage capacity of the memory 803 may suffice to be about 200 GB or less comparable to the storage capacity of a small-scale library and practically, it may preferably measure about 100 GB.

Each person possesses an information display device by means of which the person fetches information from an information output apparatus installed on the street or at a site where many persons gather. An embodiment of the information display device will now be explained with reference to FIG. 6. This device schematically comprises a recording medium 101 in which information is stored, a display unit 201 for displaying information reproduced from the recording medium 101, and a main body as designated by 301 which is comprised of an information reproducing unit and the display unit 201. Details of the construction will now be described. In the present embodiment, a magnetic card is used as the recording medium 101. The magnetic card has a rectangular form having a minor side of 55 mm or less and a major side of 100 mm or less. If any one of the minor and major side defining the size of the magnetic card serving as the recording medium 101 exceeds the aforementioned dimensions, the card cannot be received in the hand to impair convenience of portability and handling, and furthermore, the size of the information display device to which the recording medium is mounted is also increased to drastically impair practicability in handling. When removed from the main body 301, the recording medium 101 is housed and held in a cartridge 102 in order that the magnetic surface of the card recorded with data in high density can be protected from disturbance. Magnetic cards held in the cartridge 102 are exchangeable. The cartridge 102 is fed with electrical power from the main body 301 through a feeding contact 103, and a driver 104, operative under speed control to insert or extract the recording medium to or from the main body 301, is provided which is realized with a motor and a roller in the present embodiment. Further, for the purpose of preventing recorded information from being erased under the influence of external magnetic fields, the cartridge 102 is covered with a magnetic shield.

Figure 2:
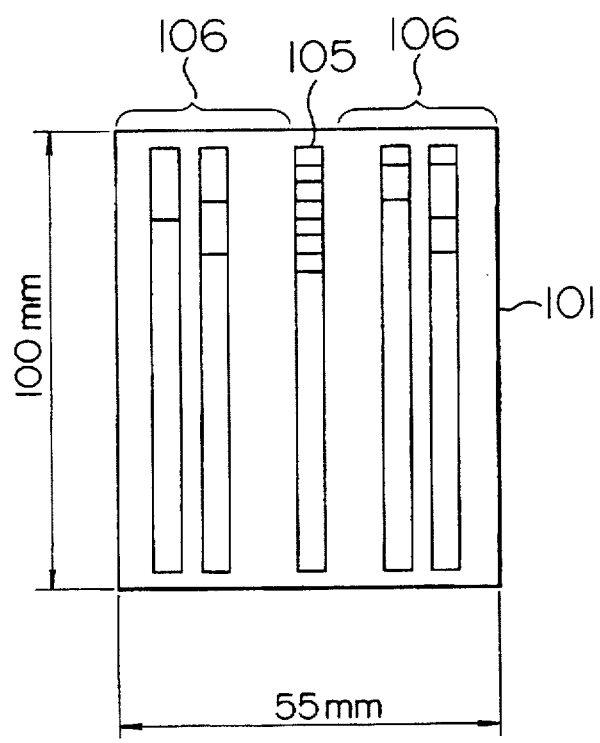
FIG. 2 is a diagram showing a recording format of information on a magnetic card.

Both side surfaces or one side surface of the magnetic card may be used as the recording surface. An information recording format on one side surface is as shown in FIG. 2, including a servo track 105 of one or more tracks and a data track 106 of one or more tracks. Each track records digital information in the form of magnetization inversion. Functionally, the servo track 105 supervises the speed of inserting the magnetic card into the main body 301 and in the event that the insertion direction of the recording medium is inclined, it provides a reference signal in accordance with which the magnetic sensor is moved in a direction in which the track shifts. The main body 301 will now be detailed. Structurally, the main body 301 is of a double-spread type in which right and left spread portions are respectively provided with the display units 201. A photoelectric converter element 303 is provided below each display unit 201 to generate electrical power required by the main body 301. Generated electrical power is partly fed to the main body 301 and is partly used to charge a storage battery 304 mounted in the main body to permit the use of the device even in the dark. On the other hand, the main body 301 has at its upper surface a coupler 302 for coupling with the cartridge 102 and when the cartridge 102 is coupled with the coupler 302, the driver for the cartridge 102 applies force to insert the magnetic card serving as the recording medium 101 into the main body 301. Upon insertion, the magnetic card passes near a line magnetic head 305 disposed near the coupler to reproduce information magnetically recorded on the surface of the magnetic card. Structurally, the line magnetic head 305 has two or more magnetoresistive elements arrayed in the width direction of the track to detect leakage magnetic flux from the medium surface. The line magnetic head may have a hierarchical structure in the direction of length of the track with a view of increasing track density. Further, the line magnetic head 305 is carried on a mechanism 306 for driving in the track width direction so as to follow a shift of the track in the track width direction. The drive mechanism 306 is controlled by information of the servo track so as to always follow shifts of the track in the track width direction.

Figure 3:
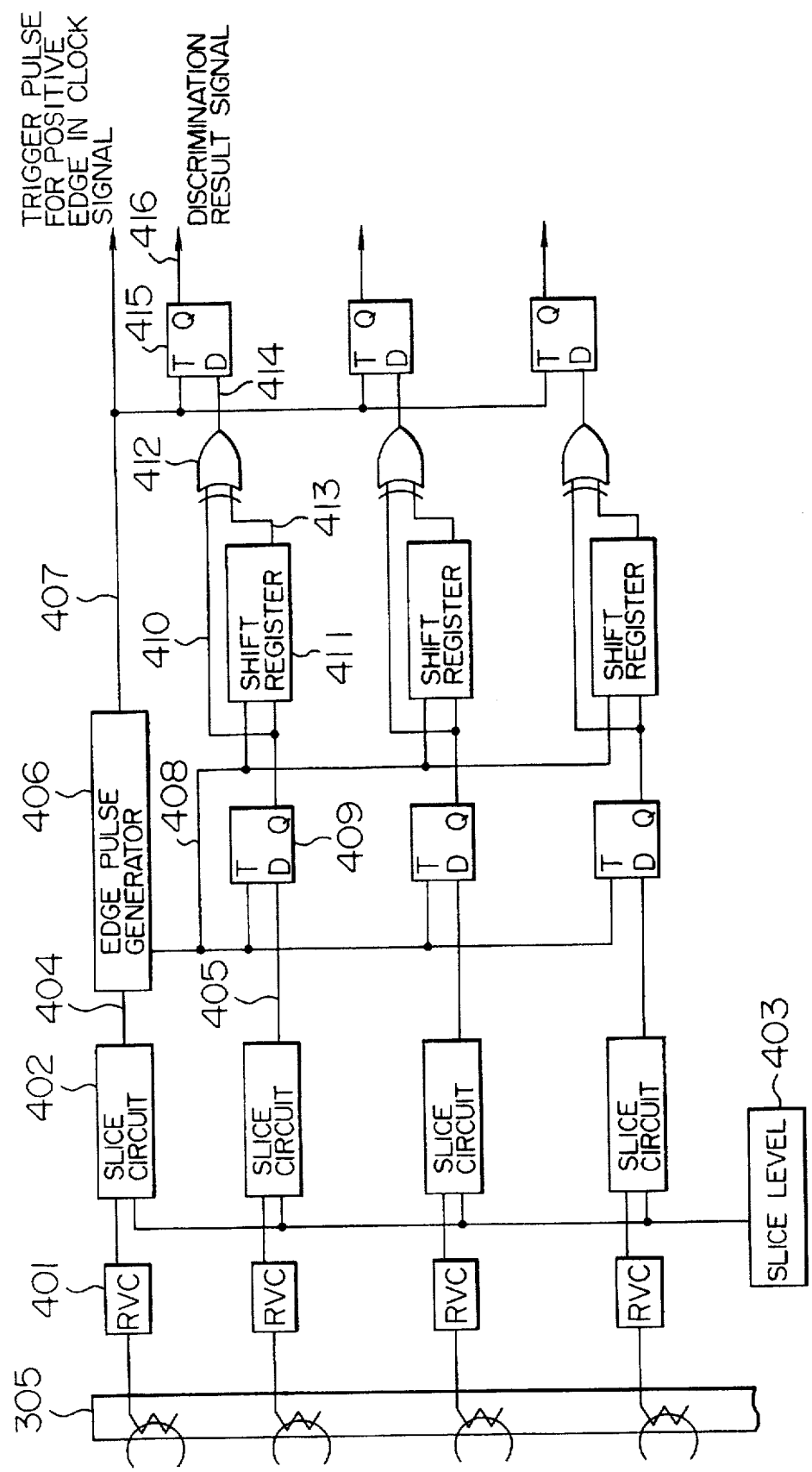
FIG. 3 is a circuit diagram of an information reproduction signal circuit system.

A signal reproduced by means of the line magnetic head 305 is converted into digital information by a signal processing circuit 307 incorporated in the main body. The manner of reproduction will be described with reference to FIGS. 3 and 4. The servo track of the recording medium is recorded with a clock signal of a constant period. The data track is recorded with digital information of a period which is a multiple of the clock signal period. The magnetoresistive element has a characteristic that its electrical resistance changes with the intensity of a magnetic field sensed by the element. Each track signal is reproduced by the magnetoresistive element and a conversion of a change in electrical resistance into a change in voltage is carried out by a R-V converter 401. The reproduced voltage signal is compared with a reference slice level 403 at a slice circuit 402 to generate a clock signal 404 or a data signal 405. An edge pulse generator 406 responds to the clock signal 404 to generate a trigger pulse 408 in synchronism with a fall of the clock signal 404 and a trigger pulse 407 in synchronism with a rise of the clock signal 404. Then, a D flip-flop 409 receives at its data input the data signal 405 and fetches the state of the data signal in accordance with the trigger pulse 408 to produce a synchronized data signal 410 at its Q output. The synchronized data signal is applied to a shift register 411 and an exclusive OR logical circuit (EX-OR) 412. The shift register delays the signal 410 by one clock in synchronism with the trigger pulse 408. A delayed signal 413 is applied to the EX-OR 412 so that the signals 410 and 413 are exclusively ORed. As a result, the EX-OR produces a high level signal when the recorded information is "1" and a low level signal when "0". However, there occurs an uncertain region at a disconnection of data and therefore the output signal of the EX-OR is applied to the data input of a D flip-flop 415 so that its state may be fetched by the flip-flop 415 in accordance with the trigger pulse 407. As a result, a discrimination result signal 416 in synchronism with the trigger pulse 407 is delivered. This type of signal processing operations are carried out in parallel for respective heads or tracks. In this manner, the information of the recording medium can be reproduced at a time.

The thus reproduced information is input to a semiconductor memory (random access memory) included in the main body. Since in some applications a plurality of pieces of information are fetched, the inputting of information to the semiconductor memory is effected in such a way that high-speed retrieval data representative of the title or key word is first stored in a high-speed retrieval region of the semiconductor memory. Data as to which area which data is stored in is also stored in this region concurrently. Subsequently, when the user fetches a plurality of pieces of information representative of details, data pieces related to information pieces selected from the plurality of information pieces are all read from the magnetic card to the semiconductor memory. The unselected remaining information pieces are left in the magnetic card. In other words, each time information pieces are selected, data pieces related to the selected information pieces are read out, one at a time. This method is employed because, when taking the standpoint convenient to the user in displaying the fetched information, it is sometimes desired to display the fetched information randomly. To provide for the high-speed random display function, the supply of data from the semiconductor memory is advantageous and therefore related data pieces are all written in the semiconductor memory. Further, magnetic information in magnetic cards is nonvolatile and can be reproduced reiteratively unless the card gets damaged. This advantage is also taken into account.

There is also provided an operation button 309 which is actuated to perform display of stored contents. By imaging books, this operation button 309 is disposed laterally of the screen.

The display unit 201 will now be described. The display units 201 have highly precise color liquid crystal display screens respectively arranged on the right and left sides and each having 600×840 dots. The display screen corresponds to the page of book. A letter format of 35 characters×25 lines can be displayed per screen and a graphic format of 600×840 dots can also be displayed per screen. Geometrical dimensions will now be described with reference to FIGS. 6 and 2. The recording medium 101 has a size of 55 mm×100 mm and a recording density of 50M bits per 1 square inch to provide a storage capacity of 40 MB per one side surface. The cartridge 102 for housing the recording medium 101, inclusive of the driver 104, has a size of 120 mm×65 mm×2 mm. The main body 301 is so designed as to be carried on the hand by having a size of 160 mm×110 mm×10 mm. The display unit 201 has a size of 100 mm×140 mm.

Another embodiment of the invention will now be described with reference to FIG. 5. In the present embodiment, the line type magnetic head used in the foregoing embodiment is replaced with a laser beam oscillator, whereby information on servo and data tracks are detected by using transmission or reflection of a laser beam. Accordingly, two kinds of recording forms of recording medium 101 are available, including a perforation type as shown in FIG. 5A and a pit type as shown in FIG. 5B. In the case of the FIGS. 5A and 5C perforation type, a recording medium 501 is perforated as indicated by 502 to provide two states of transmission and interruption for light and the laser oscillator and a light receiving element are disposed on opposite sides of the medium 501, whereby transmitting light is detected by the light receiving element to convert information into digital signals 404 and 405 of high level and low level. The subsequent signal processing is effected in a way similar to that described previously to obtain information recorded on the recording medium.

In the case of the FIGS. 5B and 5D pit type, a recording medium 503 is pitted as indicated by 504 to provide two states of a larger light reflection amount and a smaller light reflection amount and the laser oscillator and a light receiving element are disposed on the same side of the recording medium, whereby information is converted into digital signals 404 and 405 of high level and low level by detecting amounts of reflection light. The subsequent signal processing is effected similarly to the above to obtain information recorded on the recording medium. In the present embodiment, the information is recorded by changing the form of the recording medium and therefore it will advantageously be preserved.

The sizes of the apparatus explained in the present specification are examples of the present invention.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A personal information display system comprising:

a portable information display device for displaying information received from a storage medium;

a communication network for transmission of said information;

a plurality of input/output apparatuses for input/output of said information;

input/output control means, connected to said communication network and said plurality of input/output apparatuses, for controlling transmission of information between said input/output apparatuses and said communication network;

information control means having a plurality of memories for hierarchically storing information, retrieval data of said information and information indicative of an area in one of said memories where said information is stored, said information control means being connected to said communication network to control transmission of information between said communication network and said plurality of memories; and an information output apparatus connected to said information control means and having memory means for storing information frequently referenced, hold means for exchangeably holding said storage medium of said portable information display device, and information output means for transferring to and storing in said storage medium the information to be frequently referenced which is stored in said memory means and/or information transmitted through said information control means.

2. An information control apparatus comprising:

hierarchical memory means, including a semiconductor memory, for storing high-speed retrievable information and information as to which area of said hierarchical memory means the retrieved information is stored in, a magnetic disk for storing retrieval information more detailed than the high-speed retrievable information, an optomagnetic disc for storing information rewritable for use and an optical disc for storing information to be stored for a long period of time; and control means connected to a communication network for transmission of information and to a plurality of information output apparatuses, each adapted to transfer information to a storage medium which stores information used in a portable information display device, wherein in response to a request from an information output apparatus, information within said hierarchical memory means and/or said communication network is transferred to said information output apparatuses.

3. A portable information display device comprising:

a recording medium for recording information in magnetization inversion state;

a unit for reproducing said information from said recording medium;

a semiconductor memory circuit for temporarily storing said reproduced information in hierarchical order to access said information at a high speed;

a display unit for displaying said information; and a power supply employing electrical power generated by a photoelectric converter element for driving the above components as well as a storage batter said storage battery serving as said power supply when photoelectric conversion cannot be obtained, wherein in a communication network connected to a plurality of memories and a plurality of information output apparatuses and operable to transmit information under control of a plurality of computers, said portable information display device reads said information from an information output apparatus through said magnetic medium.

4. A portable information display device according to claim 3, wherein said recording medium is a magnetic card which is rewritable by recording said information in the form of magnetization inversion and said magnetic card is rectangular having minor sides of 55 mm or less and major sides of 100 mm or less and has a recording density of 50 Mb/in$^2$ and a storage capacity of at least 40 Mb per side.

5. A portable information display device according to claim 4, wherein said magnetic card is provided on one side surface with a servo track having one or more tracks and a plurality of data tracks per side.

6. A portable information display device according to claim 4, wherein said magnetic card is housed in a cartridge.

7. A portable information display device according to claim 6, wherein said cartridge is provided with a driver which is controllable in speed to insert or extract said magnetic card in or from said information display device.

8. A portable information display device according to claim 3, wherein a mechanism for driving in a direction of track width is provided and a line magnetic head is disposed on said drive mechanism.

9. A portable information display device according to claim 8, wherein said line magnetic head has two or more magnetoresistive elements arrayed in a 1:1 relationship of one element per track in the track width direction and has a hierarchical structure.

10. A portable information display device according to claim 9, wherein said line magnetic head includes optical heads arrayed in a 1:1 relationship of one optical head per track in the track width direction, and a laser oscillator and a light receiving element are provided so that a presence or absence light or a change in light quantity may be used as digital information.

11. A portable information display device according to claim 8, wherein said line magnetic head reproduces signal processings in parallel with respect to individual heads.

12. A portable information display device according to claim 3, wherein right part and left part surfaces of said information display device are respectively provided with one display unit which can be viewed in a same manner as reading books.

13. A portable information display device according to claim 3, wherein said recording medium is a medium which has a perforated medium surface or a pitted medium surface.

14. A portable information display device according to claim 3, wherein said portable information display device has the dimensions 1600 mm×110 mm×10 mm so as to be hand-held by the operator.

15. A portable information display device according to claim 3, further comprising means for implementing high-speed random display operation by transferring information related to a selected item from said recording medium to said semiconductor memory circuit and extracting only desired information from said semiconductor memory circuit to be displayed.

* * * * *